United States Patent [19]

Ausmus

[11] 4,437,537
[45] Mar. 20, 1984

[54] VEHICLE FOR SUPPORTING HANDICAPPED OCCUPANTS

[76] Inventor: Donald L. Ausmus, 14131 E. 39th Ter., Independence, Mo. 64055

[21] Appl. No.: 342,353

[22] Filed: Jan. 25, 1982

[51] Int. Cl.³ .................. B62D 61/06; A61G 5/04
[52] U.S. Cl. ................................ 180/313; 128/70; 180/6.5; 180/214; 180/DIG. 3; 297/DIG. 10
[58] Field of Search ............... 180/313, 65 R, 211, 180/214, 253, DIG. 3; 5/81 R, 81 B, 83, 86; 297/DIG. 10; 128/70; 280/290, 250, 47.34

[56] References Cited

U.S. PATENT DOCUMENTS

| | | | |
|---|---|---|---|
| 2,482,203 | 9/1949 | Peterson et al. | 180/65 |
| 2,572,149 | 10/1951 | Hind et al. | 280/290 |
| 3,137,869 | 6/1964 | Johnson | 5/86 |
| 3,629,880 | 12/1971 | Van Rhyn | 5/86 |
| 3,894,601 | 7/1975 | Gestring | 180/214 |
| 3,997,926 | 12/1976 | England | 5/81 R X |
| 4,054,319 | 10/1977 | Fogg, Jr. et al. | 297/DIG. 10 X |
| 4,155,416 | 5/1979 | Ausmus | 180/214 |
| 4,314,552 | 2/1982 | Moon | 128/70 |

FOREIGN PATENT DOCUMENTS

| | | | |
|---|---|---|---|
| 2131883 | 1/1973 | Fed. Rep. of Germany | 297/DIG. 10 |
| 2265348 | 11/1975 | France | 180/211 |

*Primary Examiner*—Joseph F. Peters, Jr.
*Assistant Examiner*—Mitchell J. Hill
*Attorney, Agent, or Firm*—Sheridan, Ross & McIntosh

[57] ABSTRACT

An occupant operated motor driven vehicle for supporting handicapped occupants adapted to be tilted forwardly by the occupant for retrieving articles lying on the vehicle support surface, and to be restored to vertical operating position. The apparatus by which the vehicle may be tilted and restored comprises a pair of hinged parallel support feet adapted to contact the vehicle support surface for supporting the vehicle in a forward tilt, and to be returned to nested position, and power driven extensible and retractable vehicle support means for moving said feet connected between the feet and the vehicle frame for forwardly tilting said vehicle and restoring it to its upright position.

16 Claims, 5 Drawing Figures

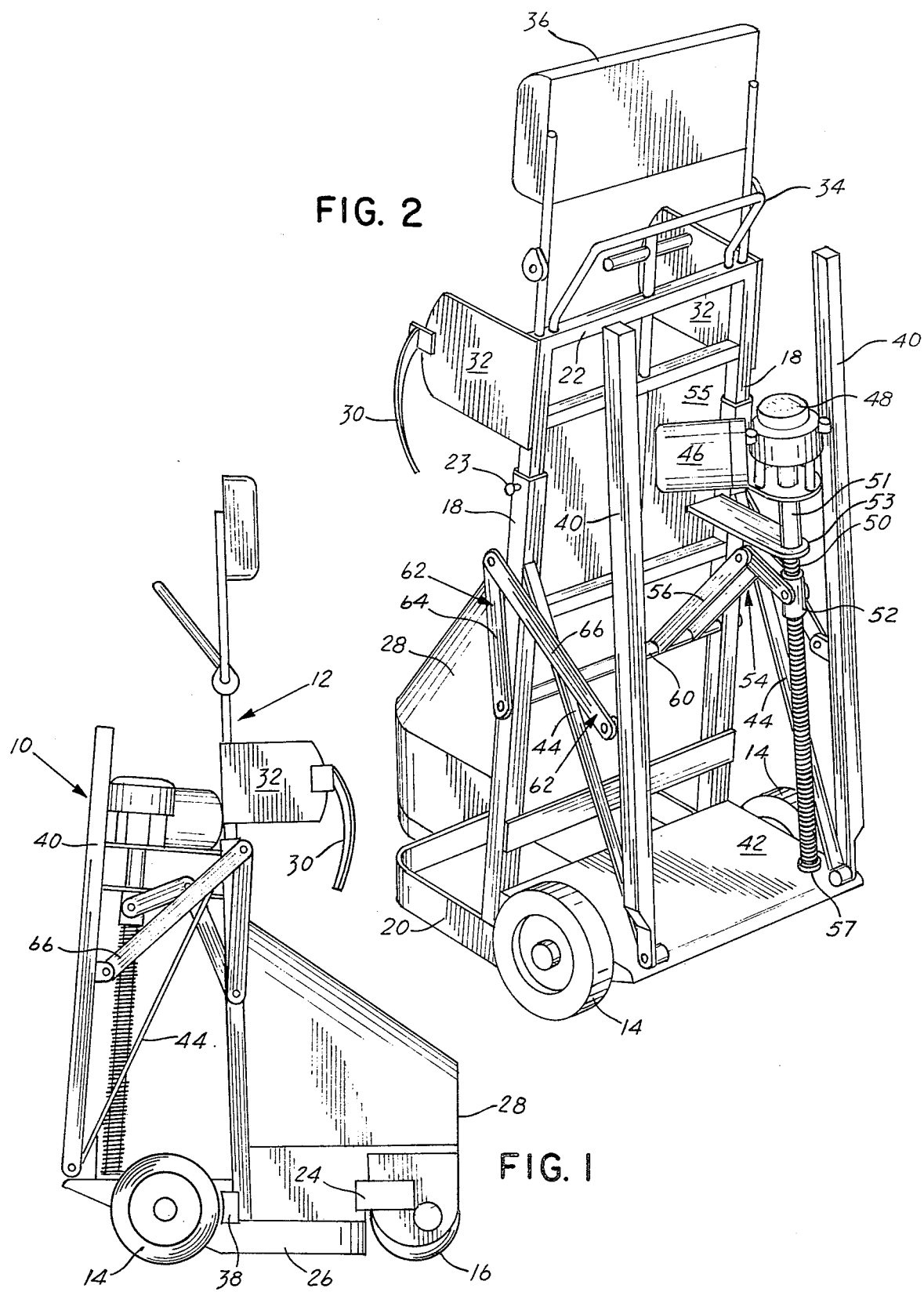

VEHICLE FOR SUPPORTING HANDICAPPED OCCUPANTS

DESCRIPTION

TECHNICAL FIELD

The invention is in the field of motorized vehicles for handicapped personnel.

BACKGROUND ART

U.S. Pat. No. 4,155,416 discloses a motorized vehicle for supporting handicapped people, such as paraplegics, in standing position. There is no disclosure in this patent of operating structure for forwardly tilting the vehicle and occupant to the proximity of the vehicle supporting surface for recovery of tools or other objects, and restoring the vehicle to upright travelling position. The same is true of French patent No. 2,265,348-10/1975, Class 180, Subclass 26 R.

Other patents of interest are U.S. Pat. No. 2,482,203; 2,572,149; 3,137,869; 3,629,880; 3,894,601; 4,054,319; and German No. 2,131,883-1/1973, Class 297, Subclass DIG 10. None of these patents disclose vehicles which can be tilted for the purpose of enabling the occupant to recover tools or other objects lying on the vehicle's supporting surface.

DISCLOSURE OF THE INVENTION

The invention is an improvement on the vehicle disclosed in my U.S. Pat. No. 4,155,416, and comprises vehicle tilting and restoring means attached to a vehicle for supporting handicapped people in standing position, the means adapted to extend and unfold forwardly of the vehicle to contact the vehicle supporting surface and lower the vehicle into proximity to its supporting surface for retrieval of objects by the occupant, and to raise the vehicle and occupant to the upright travelling position of the vehicle, said means then retracting into its upright nesting position.

The power source of the vehicle tilting and restoring system is a reversing electric motor operating a vertically mounted externally threaded ball screw shaft rotating inside a non-rotating internally threaded ball nut. Rotation of the ball screw shaft moves the ball nut vertically to impart linear motion to a first dual linkage system connected between the ball nut and a rotatable drive shaft mounted on the vehicle to rotate the drive shaft in forward and reverse directions. Rotation of the drive shaft imparts motion to a second dual linkage system connected between the drive shaft and the two supporting feet of the tilting and restoring system to contact the feet with the vehicle supporting surface, or to retract the feet into vertical nesting position as required.

In operation, the occupant actuates the motor in the forward direction to extend the feet to within a small angle of the supporting surface, perhaps about 15 degrees, where they are held locked by the reversing motor. In the second step the occupant shifts his weight forwardly with a slight lunge to contact the locked feet with the supporting surface and tilt the vehicle forwardly beyond it center of gravity so that is and the occupant are supported at a forward angle by the feet with most of the weight on the feet. Occupant then reverses the motor and since the weight of the vehicle and occupant is on them the result is that the vehicle is lowered to any angle necessary for the occupant to retrieve an object from the vehicle supporting surface. After the object has been retrieved, occupant shifts the motor to the forward condition to restore the vehicle to its upright position. In the final step occupant reverses the motor to restore the supporting feet to their upright nested position.

BRIEF DESCRIPTION OF DRAWINGS

In all of the figures of the drawings except FIG. 1, the vehicle is shown facing forwardly to the right, the dual wheels being front wheels and the single wheel being the rear wheel.

FIG. 1 is a side schematic view of a typical vehicle for supporting a paraplegic in standing position, the vehicle equipped with the tilting and restoring system of the invention shown in folded or nesting position;

FIG. 2 is a partially perspective view of the apparatus of FIG. 1;

DESCRIPTION OF THE ILLUSTRATIVE EMBODIMENT

Figure 3:
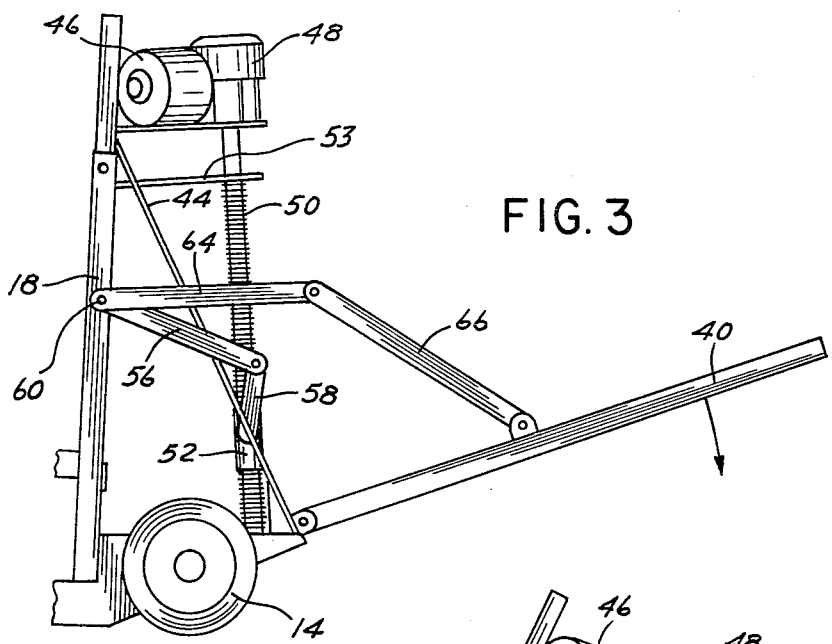
FIGS. 3, 4 and 5 are schematic side views of the demountable lower frame section of the vehicle with the tilting and restoring system attached and showing successive positions during tilting of the vehicle, only one of the sets of dual linkages being shown.

The invention will be described as used with a vehicle, such as that disclosed in my U.S. Pat. No. 4,155,416, for supporting paraplegics or other handicapped persons in standing position; however, it is not limited to this type vehicle and, particularly, it could be used with vehicles supporting handicapped persons in a sitting position. It can be used with vehicles operated by non-handicapped persons.

Referring to FIG. 1, the numeral 10 represents generally the tilting and restoring system of the invention attached by conventional means to the forward frame of a vehicle represented generally at 12.

Referring to FIGS. 1 and 2, the vehicle is supported by the two forward wheels 14 and the rear wheel 16. The two vertical supporting frame members are indicated by the numeral 18 secured by their lower ends to bottom frame member 20 and connected at their upper ends by cross-piece 22. Preferably, the frame members 18 are comprised of upper and lower tubular members with one nesting inside the other to permit vertical adjustment by means of set screw 23.

The vehicle is driven by a conventional electric motor shown schematically at 24 and steered by rear wheel 16.

The occupant's feet are positioned on platform 26 with his legs straddling shroud 28. Adjustable belt 30 secured at either end to hip pads 32 supports the occupant on the vehicle with his chest resting on either lower body support 34 or adjustable upper body support 36. Braking means represented schematically at 38 of conventional design is optional for use with the present improvement invention. The exemplary vehicle itself is more specifically described in my U.S. Pat. No. 4,155,416; however, the improvement of the invention is not limited for use with this particular vehicle.

For supporting the vehicle in forwardly tilted position, support feet 40 are hingedly mounted as shown at their lower ends to forward platform 42 supported on frame member 18 by braces 44, to rotate through an angle of approximately 90 degrees. Each support foot is operated through its own folding linkage system by a conventional reversing motor 46 similar to the motor described under numeral 146 in my U.S. Pat. No. 4,155,416.

Referring to FIG. 2, a reversing electric motor 46 is operatively connected through conventional gear box 48 to rotatable, vertically mounted, externally threaded ball screw shaft 50 rotating inside non-rotating internally threaded ball nut or sleeve 52 so that the ball nut moves vertically as the screw shaft rotates, the direction of movement of the ball nut depending on whether the motor is in forward or reverse gear. When the motor is off it acts as a brake for the system.

The assembly of motor 46, gear box 48, screw shaft 50 and ball nut 52 is supported brace or shelf 53 attached to sleeve 51 at its proximate end as shown in FIGS. 2 and 3 and welded to wall 55 at its distal end. The assembly may be fixedly supported on the vehicle by various other conventional means such as a brace attached to motor 56 and frame member 18 or one of the cross braces 22. The bottom of screw shaft 52 is preferably mounted in a conventional thrust bearing shown schematically at 57 or it may be allowed to rotate near the top of metal platform 42 without a thrust bearing as it is vertically supported by sleeve 51.

A first dual linkage system indicated generally by the numeral 54 and comprised of pairs of levers 56 and 58 (FIG. 3) is operatively connected to ball nut 52. The levers 58 are hingedly attached to ball nut 52 at their proximate ends as shown and hingedly attached at their distal ends to corresponding distal ends of levers 56 which are fixedly attached at their proximate ends to rotatable drive shaft 60 (FIG. 2) so that vertical movement of ball nut 52 rotates drive shaft 60.

Rotation of drive shaft 60 imparts motion to the support feet 40 through a second dual linkage system represented generally at 62 comprising a pair of levers 64 fixedly attached at their proximate ends to the ends of drive shaft 60 and hingedly connected at their distal ends to corresponding distal ends of levers 66 which are hingedly connected at their proximate ends to support feet 40, all as illustrated, the various attachments and connections being of conventional construction. It is seen from the above-described construction that operation of motor 46 by a conventional operating button or switch (not shown) in forward or reverse gear will, respectively, advance or retract support feet 40 while the feet will be held stationary when the motor is not operating.

The above described construction of the tilting and restoring system of the invention is not critical and, particularly, the linkage systems, the requirement being that occupant operated power means be provided for operating and braking the support feet. For example, a hydraulic ram connected between the feet and frame could be used as the extending and collapsing means for the feet. A single lever rather than pairs may be used in the linkage systems.

Figure 4:
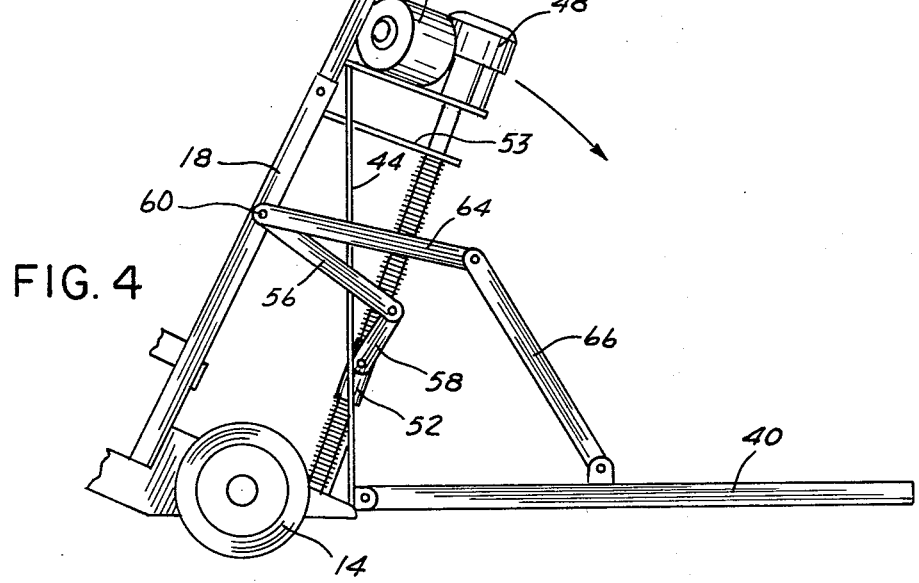
Figure 5:
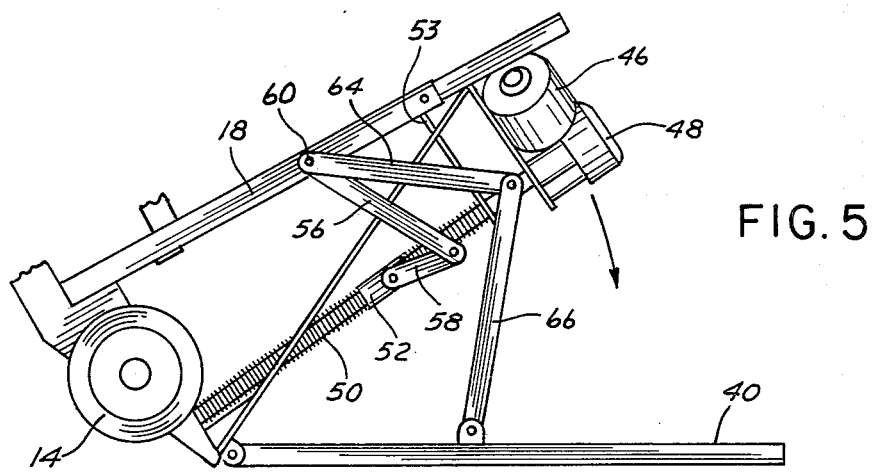

In operation, for retreiving an object on the vehicle support surface, the occupant first shifts the motor 46 to forward gear to extend the feet 40 to within a small angle of the support surface as shown in FIG. 3 where they are locked as the motor is shut off. In the second step the occupant shifts his weight forwardly with a slight lunge to contact the locked feet 40 with the supporting surface and tilt the vehicle forwardly beyond its center of gravity as shown in FIG. 4 so that it is supported as a forward angle by the feet with most of its weight, including that of the occupant, on the feet. Occupant then reverses the motor and this would normally raise the feet 40 but as the weight of the vehicle and occupant is on the support feet the result is that the vehicle is lowered to any angle necessary as shown in FIG. 5 for the occupant to retrieve an object from the vehicle support surface.

After the object has been retrieved, occupant shifts the motor to the forward gear so that the forward force of the feet 40 on the vehicle support surface restores the vehicle to the upright travelling position. The final step is reversing the motor to retract the support feet to their upright nested position as shown in FIG. 2.

What is claimed is:

1. An occupant operated motor driven vehicle for supporting a handicapped occupant, such as, a paraplegic, comprising in combination:
   (a) a vehicle comprising a frame supported on at least one front wheel and at least one rear wheel and including structure for supporting a handicapped occupant in said vehicle;
   (b) at least one support foot rotatably attached to said vehicle adapted to swing forwardly of said vehicle and contact the vehicle support surface for supporting said vehicle in a forward tilt when said foot is locked in stationary position;
   (c) support foot positioning means connected between said foot and said frame operative to position said foot at various angles to said vehicle;
   (d) occupant operated driving means for operating said support foot positioning means to position said foot at various angles to said vehicle, and
   (e) means for locking said foot in a desired angular position to support said vehicle and occupant in a forward angular position.

2. The vehicle of claim 1 including braking means for said front wheel.

3. The vehicle of claim 1 including occupant supporting means for supporting said occupant in a standing position.

4. The vehicle of claim 1 including:
   (a) a drive shaft rotatably mounted on said frame;
   (b) a first extensible and contractible lever system connected between said driving means and said drive shaft, and
   c a second extensible and contractible lever system connected between said drive shaft and said support foot.

5. The vehicle of claim 4 in which said driving means comprises:
   (a) a threaded ball screw shaft;
   (b) an internally threaded, non-rotating ball nut on said ball screw shaft, and
   (c) means for rotating said screw shaft.

6. The vehicle of claim 4 in which said first lever system comprises:
   (a) at least one first lever arm rotatably connected at its proximate end to said driving means and at its distal end to the distal end of a second lever arm having its proximate end securely attached to said drive shaft, and said second lever system comprises;
   (b) at least one first lever arm securely attached at its proximate end to said drive shaft and rotatably attached at its distal end to the distal end of a second lever arm having its proximate end rotatably attached to said support foot.

7. The vehicle of claim 6 in which said lever arms are in duplicate.

8. The vehicle of claim 6 in which said first lever arm of said first lever system is rotatably connected at its proximate end to said ball nut.

9. The vehicle of claim 1 in which said support foot positioning means comprises:
   (a) a rotatable threaded ball screw shaft mounted on said vehicle to permit rotation of said ball screw shaft;
   (b) an internally threaded, non-rotating ball nut on said ball screw shaft attached to said foot for positioning the foot at various angles to said vehicle as said ball nut moves on said ball screw shaft in response to rotation of said ball screw shaft.

10. The vehicle of claim 9 in which said vehicle has two support feet.

11. The vehicle of claim 9 including braking means for said front wheel.

12. The vehicle of claim 9 including occupant supporting means for supporting said occupant in a standing position.

13. An occupant operated motor driven vehicle for supporting handicapped occupants, such as, paraplegics, comprising, in combination:
   (a) a vehicle comprising a frame supported on two front wheels and one rear wheel and including structure for supporting a handicapped occupant in said vehicle in standing position;
   (b) two substantially parallel support feet rotatably attached to said vehicle adapted to swing forwardly of said vehicle to contact the vehicle support surface for supporting said vehicle in a forward tilt when said feet are locked in stationary position and to swing backwardly to a stored position;
   (c) a drive shaft rotatably mounted on said frame;
   (d) a motor;
   (e) a gear box operatively connected to said motor;
   (f) a threaded ball screw shaft operatively connected to said gear box;
   (g) an internally threaded, non-rotating ball nut on said ball screw shaft;
   (h) a first lever system comprising at least one first lever arm rotatably connected at its proximate end to said ball nut and rotatably attached at its distal end to the distal end of a second lever arm having its proximate end securely attached to said drive shaft; and
   (i) a second lever system comprising at least one first lever arm securely attached at its promimate end to said drive shaft and rotatably attached at its distal end to the distal end of a second lever arm having its proximate end rotatably attached to said support feet.

14. A vehicle support system adapted to be attached to a vehicle for supporting the vehicle in a forward tilt and restoring it to its upright position, comprising:
   (a) at least one hinged support foot adapted to swing forwardly of said vehicle to contact the vehicle support surface for supporting said vehicle in a forward tilt;
   (b) a ball screw shaft having threads on its outer surface;
   (c) a non-rotating internally threaded ball nut on said shaft;
   (d) means for rotating said shaft;
   (e) a first extensible and contractible lever system connected between said ball nut and a drive shaft rotatably mounted on said vehicle; and
   (f) a second extensible and contractible lever system connected between said drive shaft and said support feet.

15. The vehicle support system of claim 14 in which said first lever system comprises:
   (a) at least one first lever arm rotatably connected at its proximate end to said ball nut and at its distal end to the distal end of a second lever arm having its proximate end securely attached to said drive shaft, and second lever system comprises;
   (b) at least one first lever arm securely attached at is proximate end to said drive shaft and rotatably attached at its distal end to the distal end of a second lever arm having its proximate end rotatably attached to said support foot.

16. The method of operating a tiltable vehicle by an occupant of the vehicle to retrieve an object on the vehicle support surface, the vehicle including at least one support foot rotatably attached to said vehicle adapted to rotate forwardly of said vehicle for supporting the vehicle in tilted position when said foot is locked in stationary position and driving means for positioning said support foot at various angles to said vehicle, said method comprising:
   (a) positioning said foot to an angle less than 90° with the vehicle supporting surface and locking it in this position;
   (b) tilting said vehicle and foot forwardly until the foot contacts the vehicle support surface so that the vehicle and occupant are tilted forwardly beyond the vertical with their weight on the foot;
   (c) further positioning said foot to tilt said vehicle until said occupant can reach the article to retrieve it;
   (d) further positioning said support foot until the vehicle is in upright position; and
   (e) further positioning said foot until it is in its stored position.

* * * * *